United States Patent [19]
Kondo

[11] 3,830,550
[45] Aug. 20, 1974

[54] ANTI-SKID BRAKE CONTROL SYSTEM FOR VEHICLES

[75] Inventor: Toshiyuki Kondo, Toyota, Japan

[73] Assignee: Aisin Seiki Kabushiki Kaisha, Aichi-ken, Japan

[22] Filed: Nov. 3, 1972

[21] Appl. No.: 303,475

[30] Foreign Application Priority Data
Nov. 9, 1971 Japan.................. 46-104467[U]
Nov. 9, 1971 Japan.................. 46-104466[U]

[52] U.S. Cl............................. 303/21 F, 188/181 A
[51] Int. Cl.............................................. B60t 8/12
[58] Field of Search.......... 303/21 F, 21 CG, 21 CF, 303/21 C, 21 B, 21 R, 21 A, 21 CH, 21 BE, 61–63, 68–69; 188/181

[56] References Cited
UNITED STATES PATENTS
3,467,441  9/1969  Clarke et al................... 303/21 F
3,556,609  1/1971  MacDuff........................ 188/181 A
3,667,811  6/1972  Okamoto et al................ 303/21 F Primary Examiner—Duene A. Reger
Assistant Examiner—D. C. Butler
Attorney, Agent, or Firm—Berman, Bishoff & Platt

[57] ABSTRACT

An improved anti-skid brake control system of the type comprising a cut-off valve and a hydraulic capacity controller disposed within a hydraulic braking circuit connecting a master cylinder with wheel brake cylinders, wherein in an anti-skid operation, the cut-off valve first blocks passage of pressurized fluid from the master cylinder to the wheel brake cylinders, and then the capacity controller is conditioned for its pressure decreasing operation for effecting the anti-skid operation. The cut-off valve and the capacity controller are integrally mounted within one housing to be compact in size. Furthermore, the correlative operation between the cut-off valve and the capacity controller can easily be adjusted to the most desirable condition by way of the axial adjustment of a plynger of the capacity controller.

11 Claims, 5 Drawing Figures 3,830,550

ANTI-SKID BRAKE CONTROL SYSTEM FOR VEHICLES

BACKGROUND OF THE INVENTION

The present invention relates generally to anti-skid brake control systems, and more particularly to a novel improvement of the system of a type comprising a cut-off valve and a hydraulic capacity controller disposed within a hydraulic braking circuit connecting a master cylinder with wheel brake cylinders, wherein in an anti-skid operation, the cut-off valve blocks passage of hydraulic pressure from the master cylinder to the wheel brake cylinders and then the capacity controller is conditioned for its pressure decreasing operation for effecting the anti-skid operation.

SUMMARY OF THE INVENTION

The main object of the present invention is, therefore, to provide an anti-skid brake control system, wherein correlative operation between the cut-off valve and the capacity controller can easily be adjusted to the most desirable condition.

Another object of the present invention is to provide an anti-skid brake control system, having the above mentioned characteristics, wherein the cut-off valve and the capacity controller are integrally installed within one housing to be compact in size.

A further object of the present invention is to provide an anti-skid brake control system, having the above mentioned characteristics, wherein the operation means for the cut-off valve and a plunger of the capacity controller are individually or separately assembled so that an eccentric positioning of the two components to each other will produce no undesired twisting force, which results in a very easy assembling.

A still further object of the present invention is to provide an anti-skid brake control system, having the above mentioned characteristics, wherein the adjustment of the correlative positioning of the cut-off valve and the plunger of the capacity controller is particularly easier when a ball valve is adopted as the cut-off valve.

A further object of the present invention is to provide an anti-skid brake control system, having the above mentioned characteristics, wherein the system is designed to be most suitable for pneumatic servo means and to ease the adjustment of the plunger positioning.

According to the present invention, briefly summarized, in a vehicle having a master cylinder, wheel brake cylinders and a hydraulic braking circuit to supply pressurized fluid to the wheel brake cylinders from the master cylinder, there is provided an anti-skid brake control system which comprises a skid sensor for generating first and second signals therefrom in response to wheel locking conditions; and a servomotor including a diaphragm piston pneumatically operated in response to the signals. The anti-skid brake control system further comprises a housing provided therein with a first fluid chamber in connection with the master cylinder and a second fluid chamber in communication with the wheel cylinders; a cut-off valve disposed within the first fluid chamber for selectively blocking the pressure communication between the first and second fluid chambers; and an hydraulic capacity controller including a plunger slidable within the second fluid chamber and operatively connected with the cut-off valve and the diaphragm piston of the servomotor at its both ends respectively, the plunger being operated by the diaphragm piston, for controlling the capacity of the second fluid chamber on activation of the cut-off valve, to decrease the pressurized fluid supplied to the wheel cylinders.

BRIEF DESCRIPTION OF THE DRAWINGS

The above and other objects, features and attendant advantages of the present invention will be more fully appreciated as the same becomes better understood from the following detailed description of the preferred embodiment when considered in connection with the accompanying drawings, wherein.

DESCRIPTION OF THE PREFERRED EMBODIMENTS

Figure 1:
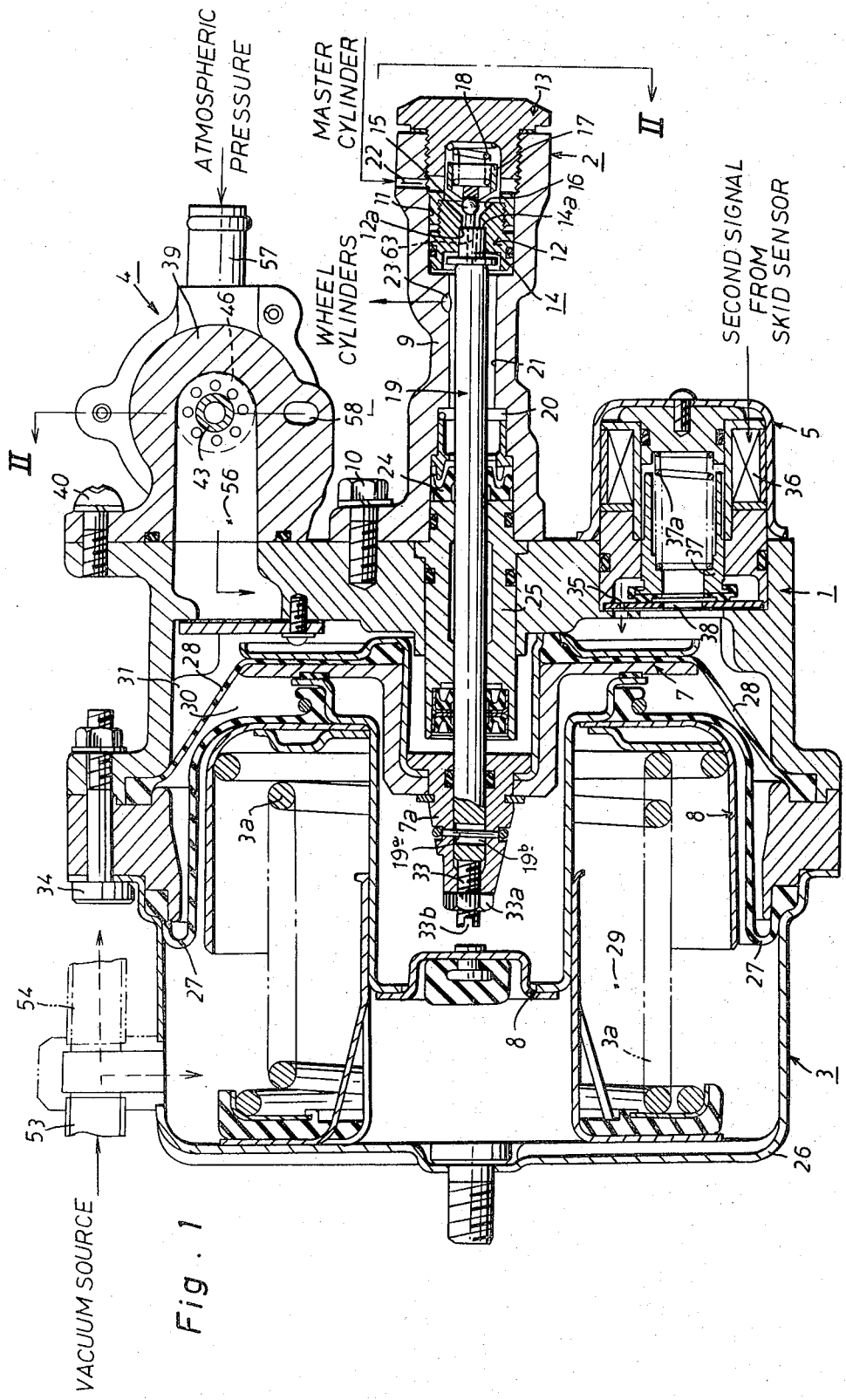
FIG. 1 is a vertical cross-sectional view taken substantially along line I — I of FIG. 2 and showing an improved anti-skid brake control system constructed in accordance with the present invention.

Outlining a preferred embodiment of the present invention in reference to the drawings, the system comprises its main body 1, a hydraulic controller 2 for decreasing hydraulic pressure supply from a master cylinder to wheel brake cylinders in the case of locking of the same, the controller 2 including a cut-off valve device and a capacity controller therein, a servomotor 3 to regulate the controller 2, an electrode selector valve 4 to activate the servomotor 3, and a booster valve 5 to control the operation of the servomotor 3 in response with the locking degrees. The system further includes a first check-switch 6 for confirming the operation of the servomotor 3 and a second check-switch 70 for confirming emergent operation of the servomotor 3.

Referring now particularly to FIG. 1, the hydraulic controller 2 comprises a housing 9 provided therein with a differential cylindrical bore represented by a large diameter cylinder 11, a small diameter cylinder 21, and a pressure chamber 20. The housing 9 includes an inlet port 22 and an outlet port 23 drilled thereon, the ports 22 and 23 being in communication with the master cylinder and wheel cylinders respectively. The housing 9 is firmly fixed on the main body 1 by way of fastening bolts 10.

A piston guide 12 is hermetically installed within the cylinder 11 which is closed by a plug 13, the plug 13 being threaded over the piston guide 12. The piston guide 12 provides a valve seat 16 for a ball valve 15. A guide member 17 is slidably installed in a cavity within the plug 13 and works also as a spring retainer for a spring 18 to normally bias the ball valve 15 leftward in the figure. A piston 14 engages slidably with the central axial through hole of the piston guide 12. A projection at the right end of the piston 14 is in contact with the ball valve 15 so as to keep the ball valve 15 apart from the valve seat 16. The piston guide 12, the plug 13, the ball valve 15, the piston 14, the valve guide 17 and the spring 18 cooperate to form the cut-off valve.

A plunger 19 is slidable within the housing 9 through the cylinder 21 and the pressure chamber 20 for controlling the capacity of the pressure chamber 20. The plunger 19 is supported by a seal member 24 and a guide 25 fixed on the main body 1 and is at its right end engaged with the left end of the piston 14.

It should be well understood that the piston 14 and the plunger 19 are not necessarily assembled in a concentrical position to each other so that easy production and assembling can be realized. Furthermore, oscillations of the plunger 19 cause no problem.

The servomotor 3 comprises a casing 26 which is secured on the main body 1 by way of fastening bolt/nut sets 34 and includes therein a first diaphragm piston 7 and a second or emergent diaphragm piston 8, the first and second pistons 7 and 8 being provided respectively with diaphragms 28 and 27. A spring 3a is provided to bias the pistons 7 and 8 rightward in the figure. The interior of the servomotor 3 is divided into three hermetic chambers 29, 30 and 31 by means of the pistons 7 and 8. The chamber 29 is constantly in communication with a vacuum source, the chamber 30 is always connected to the atmospheric pressure and the chamber 31 is normally connected to the vacuum source and switched-over to be in communication with the atmospheric pressure in the case of skidding. Consequentially, the second piston 8 is normally displaced leftward in the figure against the spring 3a by the pressure difference between the chambers 29 and 30.

A portion 7a of the piston 7 receives therein the left end portion of the plunger 19 and the left end of the plunger 19 engages with an adjusting screw 33. The adjusting screw 33 is for conditioning the plunger 19 in its predetermined position. Reference numeral 33a indicates a fastening nut for the adjusting screw 33 which is provided with a groove 33b for rotation thereof. The plunger 19 is secured to the piston portion 7a with clearance, or play, by pin stopper 19a passing through the larger slot 19b provided in the plunger.

In assembling of the piston guide 12 and the plug 13, no precise positioning of these components need be secured. But it is necessary to have the ball valve 15 stay apart from the valve seat 16. In this case, the casing 26 of the servomotor 3 is removed by unfastening the bolt/nut sets 34 and then, the adjusting screw 33 is turned to axially displace the plunger 19 for conditioning the ball valve 15 to its predetermined position.

The booster valve 5 includes therein a solenoid 36 connected to a conventional electrical skid detector (not shown in the figure), a plunger 37 and a spring 37a for normally biasing the plunger 37 leftward in the figure. The booster valve 5 further includes an orifice 35 for vacuum/atmospheric pressure communication and a large port 38 which is normally closed by the plunger 37. When a skidding of a predetermined degree is sensed by the detector, the solenoid 36 is energized by a signal generated from the detector so as to attract the plunger 37 rightward against the spring 37a. Thus, the port 38 is opened for large and quick vacuum/atmospheric pressure communication.

Figure 2:
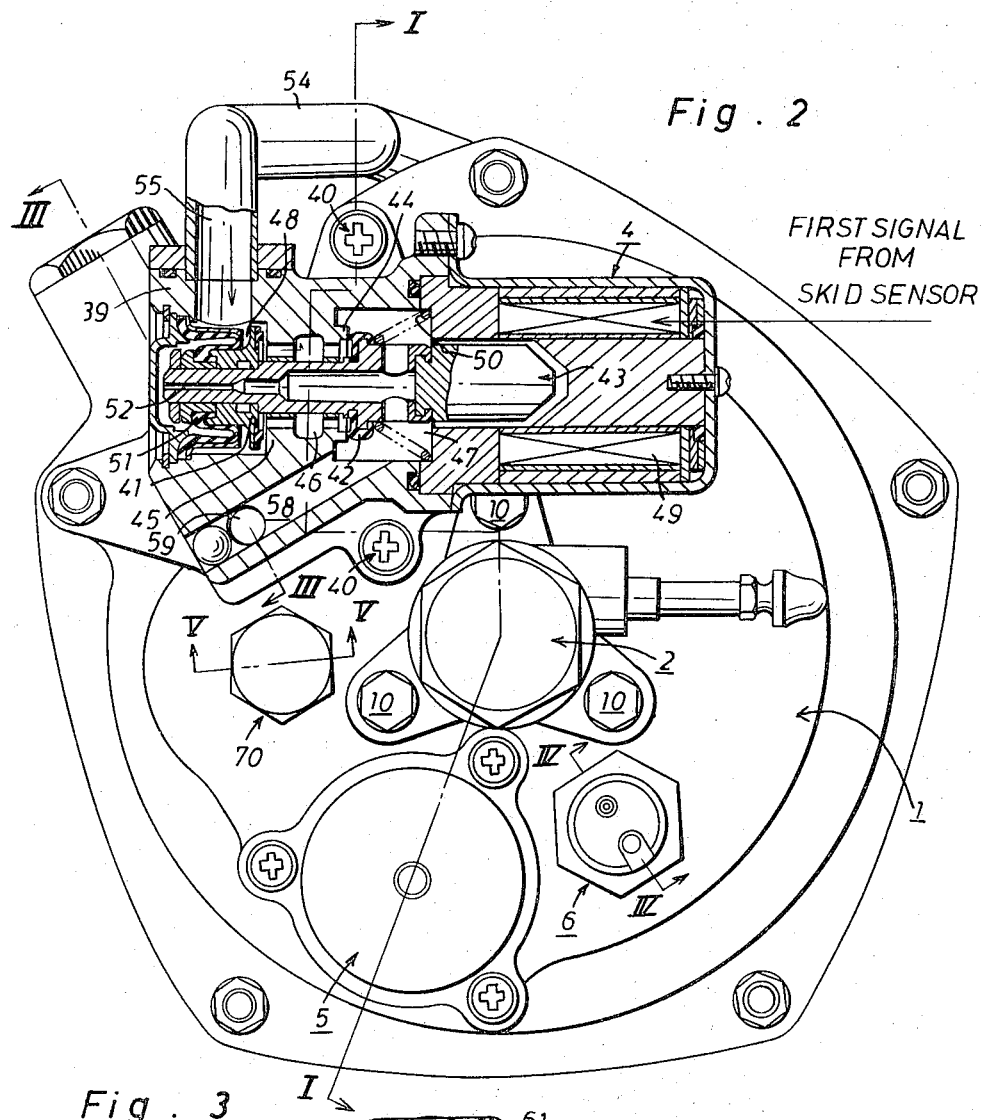
FIG. 2 is a cross-sectional view taken substantially along line II — II of FIG. 1 wherein a pneumatic selector valve is shown.

Now reference is made to FIG. 2 in respect with FIG. 1. The electrode selector valve 4 comprises a body 39 secured hermetically on the main body 1 by way of screws 40. Inside the body 39 engaged slidably is a plunger 43 including valves 41 and 42. In normal condition, the valve 42 stays on a valve seat 44 and the valve 41 stays away from a valve seat 45.

The body 39 and the plunger 43 cooperate to form chambers 46, 47 and 48. In normal condition, the chamber 46 is in communication with the chamber 48 and closed to the chamber 47. A solenoid 49 is, when energized, to attract the plunger 43 rightward in the figure against a spring 50 which normally biases the plunger 43 leftward. This makes the valve 41 seat on the valve seat 45 and the valve 42 separate from the valve seat 44. A diaphragm 51 is installed hermetically on the body 39 and the plunger 43. The chamber 47 is open to the atmospheric air through a pipe 57 (see FIG. 1) which is connected with the chamber 47 at a right angle against FIG. 2 and extends outward as shown in FIG. 1.

Figure 3:
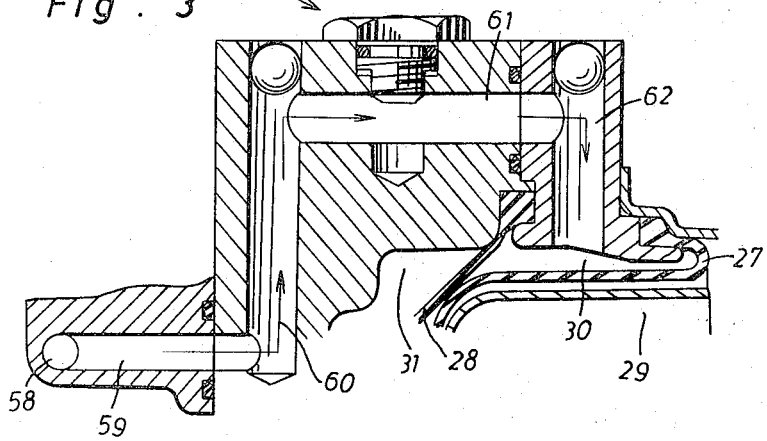
FIG. 3 depicts a partial cross-section taken substantially on line III — III of FIG. 2.
Figure 4:
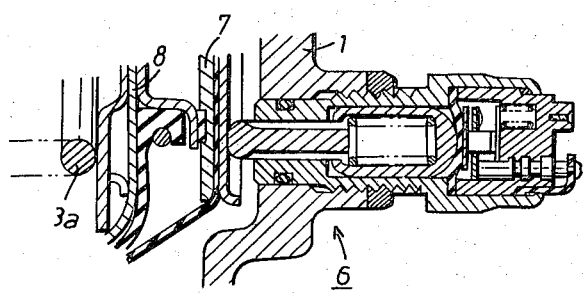
FIG. 4 is a partial cross-sectional view taken substantially on line IV — IV of FIG. 2.
Figure 5:
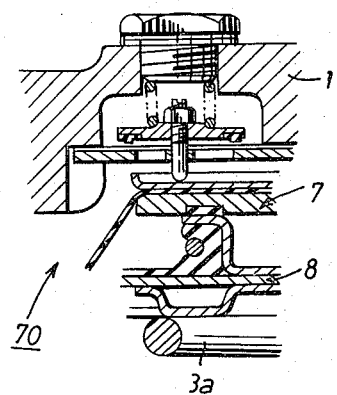
FIG. 5 is a partial cross-sectional view taken substantially on line V — V of FIG. 2.

Reference is now made to FIGS. 1, 2 and 3, a pipe 53 (FIG. 1) is in communication with the vacuum source and with the chamber 29 of the servomotor 3. The vacuum source is normally connected to the chamber 31 of the servomotor 3 through a pipe 54 (FIG. 1), a pipe 55 (FIG. 2), the chambers 48 and 46 of the selector valve 4, a duct 56 and the orifice 35 of the booster valve 5 (FIG. 1). The pipe 57 (FIG. 1) is in communication with the chamber 30 of the servomotor 3 by way of the chamber 47 of the selector valve 4, and ducts 58, 59, 60, 61 and 62 (FIG. 3).

It is now well understood from the above supply arrangements of vacuum and atmospheric pressure that the first and second pistons 7 and 8 are normally positioned respectively rightward and leftward in the figure.

The operation of the above explained anti-skid system is described hereinafter. In non-skidding brake operation, hydraulic braking pressure is supplied from the master cylinder to the wheel cylinders through the inlet port 22, a recess 63 provided on the piston 14, the chamber 20 and the outlet port 23 of the controller 2.

A signal is issued from the detector when the wheels are or about to be locked by changes of the mu or tire-road frictional coefficient and/or excessive braking operation. This signal energizes the solenoid 49 of the selector valve 4 to displace the plunger 43 rightward against the spring 50. So that the valve 42 separates from the valve seat 44 and at the same time, the valve 41 sits on the valve seat 45. The atmospheric pressure within the chamber 47 of the selector valve 4 is supplied into the chamber 31 of the servomotor 3 through the chamber 46, the duct 56 and the orifice 35. Thus, the pressure valves within the chamber 30 and 31 approach each other. Consequentially, the hydraulic pressure within the chamber 20 of the controller 2 displaces the plunger 19 together with the first piston 7 of the servomotor 3 leftward, the plunger 19 separating from the piston 14. Thus, the ball valve 15 moves to seat on the valve seat 16 by means of the spring 18. And further leftward displacement of the plunger 19 increases the capacity of the chamber 20 to decrease the hydraulic pressure supply to the wheel cylinders. This releases the wheel locking.

Upon completion of the anti-skid operation, the solenoid 49 of the selector valve 4 is deenergized and the plunger 43 returns to its original position as shown in FIG. 2 by way of the spring 50. This supplies vacuum into the chamber 31 of the servomotor 3 so that the first piston 7 is displaced rightward to the position shown in FIG. 1 by the pressure difference between the chamber 30 and 31.

When a big wheel-locking signal is issued from the detector, the solenoid 36 of the booster valve 5 is energized to attract the plunger 37 rightward. This opens the hole 38 to cause faster reciprocation of the first piston 7.

The second or emergent piston 8 is normally biased leftward by the pressure difference between the chamber 29 and 30 while vacuum is duly supplied. When the pressure difference between the chambers 29 and 30 is abnormally vanished the first check-switch 6 is operated for emergency alarm.

In the case that the first piston 7 of the servomotor 3 is not displaced rightward after the wheel locking release, that is, in the case of some accidental defects in the vacuum and/or air pressure sources, the first piston 7 can be returned rightward by way of the spring 3a so as to keep the ball valve 15 apart from the valve seat 16. This enables at least regular braking operation. And when the first piston 7 does not operate, the second check-switch 70 issues emergency alarm.

Adjustments in assembling of this preferred embodiment of the present invention can be explained as follows. The piston guide 12 and the plug 13 are first threaded together and inserted together as a unit into the housing 9 from its right end. Thus, the longitudinal position of the valve seat 16 is always indefinite, which causes indefenite positioning of the ball valve 15 to the valve seat 16. To turn the adjusting screw 33 after the casing 26 of the servomotor 3 is removed solves the problem, that is, the plunger 19 can be displaced rightward or leftward to the position to decide a proper correlative position of the ball valve 15 and the valve seat 16. For instance, when the space is too small, the adjusting screw 33 is to be turned until a shoulder 14a of the piston 14 makes contact with the bottom face 12a of the piston guide 12 and then the space between the ball valve 15 and the valve seat 16 is adjusted to be of the predetermined amount.

The length of the plunger 19 makes the length of the guide 25 rather long and cylinders 11 and 21 may not be formed concentrically. In this situation, if the plunger 19 and the piston 14 are integrally formed, eccentric positioning correlative among the pertaining components produces undesired twisting force. In this invention, the plunger 19 and the piston 14 are individualy formed and assembled, so that there will be no functional problem even if they are indefinitely or eccentrically assembled. Furthermore, the piston guide 12, the piston 14 and the plunger 19 are individually assembled which makes the assembling easier, the production and maintenance costs being much lowered.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In an anti-skid control system for a vehicle having a master cylinder, wheel brake cylinders and a hydraulic braking circuit connecting said master cylinder with said wheel cylinders, skid-sensing means for generating first and second signals therefrom in response to predetermined wheel locking conditions, and servo means including a diaphragm piston pneumatically operated in response to said signals generated from said skid-sensing means, the improvement comprising a hydraulic controller housing having a first fluid chamber connected with said master cylinder and a second fluid chamber in communication with said wheel cylinders, ball valve means disposed within said first fluid chamber for selectively blocking the pressure communication between said first and second fluid chambers, and hydraulic capacity control means including a plunger slidable within said second fluid chamber of said housing and operatively engaged with said ball valve means and said diaphragm piston at its both ends respectively, said plunger being operated by said diaphragm piston to activate said ball valve means and thereafter to control the capacity of said second fluid chamber to decrease the pressure of pressurized fluid supplied to said wheel cylinders, wherein said ball valve means comprises a ball valve for selectively blocking the pressure communication between said first and second fluid chambers and a piston to regulate the blocking operation of said ball valve, said piston being separably engaged with one end of said plunger so that said piston is normally conditioned to a predetermined valve-opening position by said plunger, and wherein said ball valve means further comprises a piston guide installed within said first fluid chamber, said piston guide being provided with a guiding hole therein to receive said piston for its reciprocation and being formed with a valve seat thereon, a ball confined within said first fluid chamber and arranged to seat on said valve seat in response with the reciprocation movement of said piston, a retainer for supporting said ball, a spring biasing said ball and retainer toward said piston, and a plug threaded over said piston guide and in said controller housing to form said first fluid chamber and to regulate the biasing force of said spring.

2. The improvement in an anti-skid brake control system as set forth in claim 1, wherein said second fluid chamber includes a capacity control chamber for decreasing the pressurized fluid supplied to said wheel cylinders in response to the operation of said plunger.

3. The improvement in an anti-skid brake control system as set forth in claim 1, wherein is additionally provided adjusting means for axially regulating the engaging position between said plunger and said piston so as to determine said predetermined valve-opening position of said piston for said ball valve means, wherein is provided means connecting the other end of said plunger to said diaphragm piston with a predetermined axial clearance for sliding movement of the plunger, said adjusting means comprising an adjusting screw threaded to a portion of said diaphragm piston and in axial alignment with the plunger, a locking nut to hold said screw, a stopper pin passing through a portion of said diaphragm piston and a diametrical slot in the plunger, said slot being larger than said pin thereby defining the axial clearance displacement between said plunger and said diaphragm piston.

4. In an anti-skid control system for a vehicle having a master cylinder, wheel brake cylinders and a hydraulic braking circuit connecting said master cylinder with said wheel cylinders, skid-sensing means for generating first and second signals therefrom in response to predetermined wheel locking conditions, and servo means including a diaphragm piston pneumatically operated in response to said signals generated from said skid-sensing means, the improvement comprising an hydraulic controller housing having a first fluid chamber connected with said master cylinder and a second fluid chamber in communication with said wheel cylinders, cut-off valve means disposed within said first fluid chamber for selectively blocking the pressure communication between said first and second chambers, and hydraulic capacity control means including a plunger slidable within said second fluid chamber of said housing and operatively engaged with said cut-off valve means and said diaphragm piston at its both ends respectively, said plunger being operated by said diaphragm piston to activate said cut-off valve means and thereafter to control the capacity of said second fluid chamber to decrease the pressure of pressurized fluid supplied to said wheel cylinders, wherein said cut-off valve means comprises a valve for selectively blocking the pressure communication between said first and second fluid chambers and a piston to regulate the blocking operation of said valve, said piston being separably engaged with one end of said plunger so that said piston is normally conditioned to a predetermined valve-opening position by said plunger, and wherein is provided means connecting the other end of said plunger to said diaphragm piston with a predetermined axial clearance for sliding movement of the plunger, said means connecting the plunger including a stopper pin passing through a portion of said diaphragm piston and a diametrical slot in the plunger, said slot being larger than said pin thereby defining the axial clearance displacement between said plunger and said diaphgram piston.

5. The improvement in an anti-skid brake control system as set forth in claim 4, wherein is additionally provided adjusting means for axially regulating the engaging position between said plunger and said piston so as to determine said predetermined valve-opening position of said piston for said cut-off valve means.

6. The improvement in an anti-skid brake control system as set forth in claim 5, wherein said adjusting means comprises an adjusting screw threaded to a portion of said diaphragm piston and in axial alignment with the plunger, and a locking nut to hold said screw.

7. The improvement in an anti-skid brake control system as set forth in claim 5, wherein said valve for selectively blocking the pressure communication between said first and second chambers is a ball valve which is controlled by said piston.

8. In an anti-skid control system for a vehicle having a master cylinder, wheel brake cylinders and a hydraulic braking circuit connecting said master cylinder with said wheel cylinders, skid-sensing means for generating first and second signals therefrom in response to predetermined wheel locking conditions, and servo means including a diaphragm piston pneumatically operated in response to said signals generated from said skid-sensing means, the improvement comprising a hydraulic controller housing having a first fluid chamber connected with said master cylinder and a second fluid chamber in communication with said wheel cylinders, cut-off valve means disposed within said first fluid chamber for selectively blocking the pressure communication between said first and second fluid chambers, and hydraulic capacity control means including a plunger slidable within said second fluid chamber of said housing and operatively engaged with said cut-off valve means and said diaphragm piston at its both ends respectively, said plunger being operated by said diaphragm piston to activate said cut-off valve means and thereafter to control the capacity of said second fluid chamber to decrease the pressure of pressurized fluid supplied to said wheel cylinders, wherein said servo means includes first and second pneumatic chambers formed on one side of said diaphragm piston and a third pneumatic chamber formed on the other side of said diaphragm piston, said first and third pneumatic chambers being normally in communication with a vacuum source and said second chamber being constantly in communication with atmospheric pressure, and a pneumatic selector valve means electrically operated by said first signal from said skid-sensing means to connect said third pneumatic chamber with atmospheric pressure to activate said diaphragm piston, whereby said plunger is retracted by said diaphragm piston aided by braking pressure produced within said second fluid chamber of said hydraulic controller housing.

9. The improvement in an anti-skid brake control system as set forth in claim 8, wherein said servo means further includes second pneumatic selector valve means electrically operated by said second signal from said skidsensing means for connecting said third pneumatic chamber with atmospheric pressure during the activation of said first selector valve means so as to provide additional pneumatic communication between said third pneumatic chamber and the atmospheric pressure.

10. The improvement in an anti-skid brake control system as set forth in claim 8, wherein said plunger includes adjusting means for determining the pre-set axial position of said plunger with respect to an assembled condition of said cut-off valve means, said adjusting means being provided adjacent the end portion of the plunger which is engaged by said diaphragm piston.

11. The improvement in an anti-skid brake control system as set forth in claim 10, wherein said servo means includes a second diaphragm piston, said two diaphragm pistons defining three pneumatic chambers, said servo means including the second diaphragm piston and two of said chambers being removably attached to said first diaphragm piston and said controller housing, whereby upon removal of said servo means access is had to said adjusting means for said plunger.

* * * * *